(12) United States Patent
Inami

(10) Patent No.: US 8,400,656 B2
(45) Date of Patent: Mar. 19, 2013

(54) IMAGE COMMUNICATION APPARATUS

(75) Inventor: Norikazu Inami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1140 days.

(21) Appl. No.: 12/303,353

(22) PCT Filed: May 10, 2007

(86) PCT No.: PCT/JP2007/059695
§ 371 (c)(1),
(2), (4) Date: Dec. 3, 2008

(87) PCT Pub. No.: WO2007/141989
PCT Pub. Date: Dec. 13, 2007

(65) Prior Publication Data
US 2009/0180154 A1    Jul. 16, 2009

(30) Foreign Application Priority Data

Jun. 6, 2006    (JP) ................................. 2006-157866

(51) Int. Cl.
*G06F 15/00* (2006.01)
(52) U.S. Cl. ....... 358/1.15; 358/402; 358/434; 358/440; 358/448
(58) Field of Classification Search .................. None
See application file for complete search history.

(56) References Cited

U.S. PATENT DOCUMENTS

| | | | |
|---|---|---|---|
| 6,594,032 B1 | 7/2003 | Hiroki et al. | |
| 2002/0015188 A1* | 2/2002 | Ishikawa et al. | 358/402 |
| 2005/0063006 A1* | 3/2005 | Tsukioka | 358/1.15 |
| 2005/0195425 A1* | 9/2005 | Bridges et al. | 358/1.15 |
| 2006/0061812 A1 | 3/2006 | Eda | |
| 2006/0143154 A1* | 6/2006 | Jager | 707/1 |
| 2006/0192990 A1 | 8/2006 | Tonegawa | |
| 2006/0248153 A1* | 11/2006 | Hejza Litwiller et al. | 709/206 |
| 2007/0223031 A1* | 9/2007 | Kitada et al. | 358/1.15 |
| 2007/0233459 A1* | 10/2007 | Perronnin | 704/9 |

FOREIGN PATENT DOCUMENTS

| | | | |
|---|---|---|---|
| JP | 2000-138790 A | 5/2000 | |
| JP | 2002-16737 A | 1/2002 | |
| JP | 2003-224699 A | 8/2003 | |
| JP | 2004-297767 A | 10/2004 | |
| JP | 2006-93892 A | 4/2006 | |

* cited by examiner

*Primary Examiner* — Thomas Lett
*Assistant Examiner* — Helen Q Zong
(74) *Attorney, Agent, or Firm* — Birch, Stewart, Kolasch & Birch, LLP

(57) ABSTRACT

The invention relates to an image communication apparatus that allows e-mail transmission with excellent versatility. Based on a result of detection provided by a document detecting section (3) for detecting the presence or absence of a document, it is determined whether or not an e-mail is transmitted with use of an attachment file by an e-mail transmitting section (7). For example, when the presence of a document is detected by the document detecting section (3), a control section (2) acts to create an e-mail with document image data read by a reading section (4) in attachment-file form, and to transmit the created e-mail. When the absence of a document is detected by the document detecting section (3), the control section acts to create an e-mail without using an attachment file of image data, and to transmit the created e-mail.

8 Claims, 6 Drawing Sheets

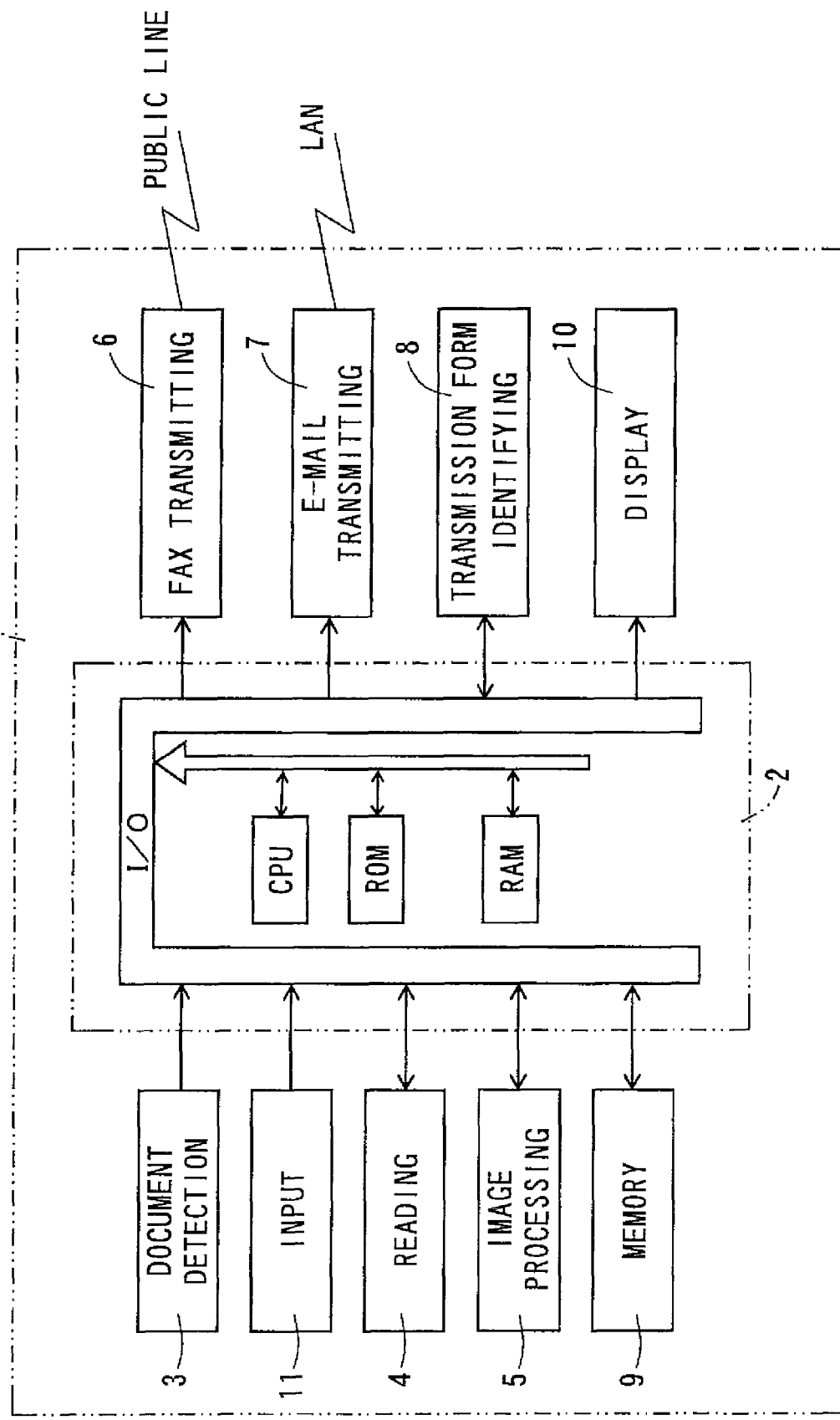

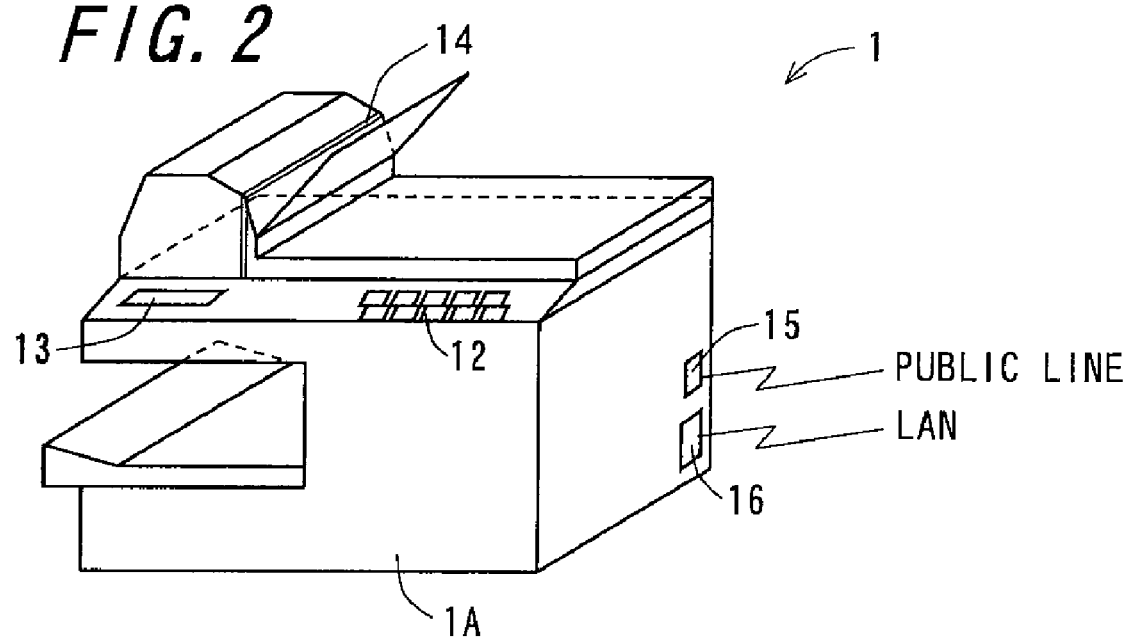

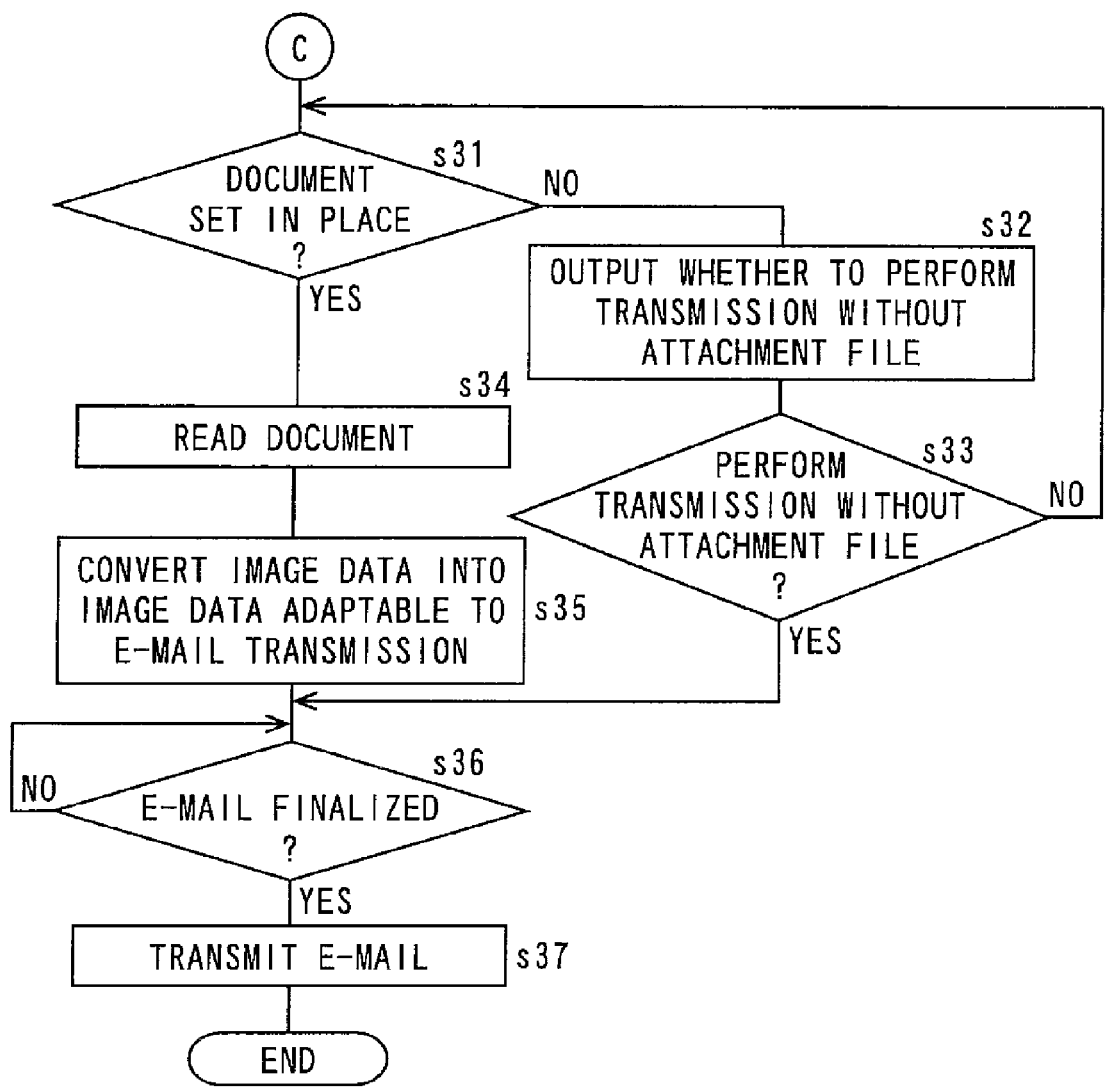

IMAGE COMMUNICATION APPARATUS

TECHNICAL FIELD

The present invention relates to an image communication apparatus.

BACKGROUND ART

As PC (Personal Computer) networks become prevalent, e-mail information communication has been coming into wider and wider use, and also e-mail image transmission, namely transmission of data on scanned-in images in the form of attachment file of e-mail has been popularized. Moreover, in keeping with advancement of multifunctional computer peripheral equipment, there is a proliferation of image communication apparatuses constructed of a scanner, a printer, and a facsimile (hereafter also referred to simply as "FAX") combined in a single-piece structure, for example, multi-function machines. Multi-function machines having the function of transmitting e-mails over a network such as a local area network (LAN) or the Internet have also been put on the market. In such an image communication apparatus, image data is transmitted in a FAX transmission style and in an e-mail transmission style as well. There thus have been proposed to date image communication apparatuses adaptable to both of the transmission styles. An image communication apparatus having a scanner function and an e-mail transmission function is provided with an e-mail transmission function called "SCAN TO E-MAIL". In this construction, image data read by the scanner function is converted into a file format suitable for e-mail transmission, so that the image data can be transmitted in the form of attachment file of an e-mail.

Taken up as the first related art is a facsimile apparatus having an e-mail transmission function. This e-mail transmission function-equipped facsimile apparatus is designed to effect facsimile transmission of document data, as well as to effect e-mail transmission of the document data and text data inputted through an input section (for example, refer to Japanese Unexamined Patent Publication JP-A 2000-138790).

Taken up as the second related art is an e-mail transmission function-equipped facsimile apparatus that is capable of controlling the details of an e-mail on an address-by-address basis. This e-mail transmission function-equipped facsimile apparatus transmits an e-mail with an image scanned by a scanner function in attachment-file form only to a main destination address, and transmits an attachment file-free e-mail to a destination address described in the field "Cc (Carbon Copy):" and a destination address described in the field "Bcc (Blind Carbon Copy):" (for example, refer to Japanese Unexamined Patent Publication JP-A 2003-224699).

According to the first related art, the facsimile apparatus transmits an e-mail with document image data read by the scanner function in attachment-file form. In such a facsimile apparatus, in order to prevent an e-mail from being transmitted in the absence of document placement, if no document is set in place, a warning message such as "DOCUMENT IS NOT FOUND" will be displayed on a liquid crystal display to urge a user to set a document in place. In such a facsimile apparatus, therefore, e-mail transmission cannot be effected without placement of a document. It is thus impossible to transmit an attachment file-free e-mail bearing text data only.

On the other hand, according to the second related art, although an attachment file-free e-mail can be transmitted to a destination address described in the field "Cc:" and a destination address described in the field "Bcc:" as well, an attachment file-containing e-mail is transmitted to a main destination address. Therefore, in the absence of document placement, just as is the case with the first related art, a warning message appears to urge a user to set a document in place, and an attachment file-free e-mail bearing text data only cannot be transmitted.

Thus, in either of the first related art and the second related art, there is a need to attach image data to an e-mail, and it is impossible to transmit a simple e-mail containing text data only. In other words, e-mail transmission cannot be effected without satisfying a condition that is not required by a user under normal circumstances. This leads to poor versatility and poor convenience.

DISCLOSURE OF THE INVENTION

An object of the invention is to provide an image communication apparatus that allows e-mail transmission with excellent versatility.

The invention provides an image communication apparatus comprising:

a document detecting section for detecting the presence or absence of a document;

a reading section for reading a document;

an e-mail transmitting section for effecting e-mail transmission of target data to be transmitted; and a control section for determining, based on a result of detection provided by the document detecting section, whether or not an e-mail is transmitted with use of an attachment file by the e-mail transmitting section.

According to the invention, based on the result of detection provided by the document detecting section for detecting the presence or absence of a document, it is determined whether or not an e-mail is transmitted with use of an attachment file by the e-mail transmitting section. For example, when the presence of a document is detected by the document detecting section, the control section acts to create an e-mail with document image data read by the reading section in attachment-file form, and to transmit the created e-mail. On the other hand, when the absence of a document is detected by the document detecting section, the control section acts to create an e-mail without using an attachment file of image data, and to transmit the created e-mail. In this way, it is possible to transmit an e-mail having no attachment of image data in the absence of document placement. Accordingly, an e-mail having no attachment of image data, for example, an e-mail containing only text data, can be transmitted. This makes it possible to achieve e-mail transmission with excellent versatility.

Moreover, in the invention, it is preferable that the image communication apparatus further comprises a facsimile transmitting section for effecting facsimile transmission of data read by the reading section, and a transmission form identifying section for identifying a transmission form to transmit target data to be transmitted in at least one of facsimile transmission form and e-mail transmission form.

According to the invention, data read by the reading section can be facsimile-transmitted by the facsimile transmitting section. Moreover, by the transmission form identifying section, a transmission form for transmitting target data to be transmitted can be identified. This makes it possible to determine whether the transmission form for transmitting target data to be transmitted involves, out of facsimile transmission and e-mail transmission, e-mail transmission or not. In such an image communication apparatus, document image data can be facsimile-transmitted, and, when the transmission form is determined to be the e-mail transmission form, an e-mail having no attachment of image data can be transmitted in the absence of document placement.

Moreover, in the invention, it is preferable that, based on a result of detection provided by the document detecting section, the control section exercises control in such a manner as to produce an output indicative of whether e-mail transmission can be effected by the e-mail transmitting section or not.

According to the invention, based on the result of detection provided by the document detecting section, an output indicative of whether e-mail transmission can be effected by the e-mail transmitting section or not is produced. For example, when the absence of a document is detected by the document detecting section, an output indicative of whether an e-mail with no use of an attachment file can be transmitted or not is produced prior to the e-mail being transmitted with no use of an attachment file. In this way, it is possible to prevent, when the user forgets to set a document in place, an e-mail containing no attachment of document image data from being transmitted without fail.

BRIEF DESCRIPTION OF DRAWINGS

The objects, features, and advantages of the invention will become more apparent by reference to the following detailed description in conjunction with the accompanying drawings, in which:

FIG. 1 is a block diagram showing the electrical configuration of a facsimile e-mail transmission apparatus in accordance with one embodiment of the invention;

FIG. 2 is a perspective view of the facsimile apparatus of the embodiment;

FIGS. 3D and 3E are flow charts showing procedural steps following the operational procedure of the control section illustrated in FIG. 3C.

BEST MODE FOR CARRYING OUT THE INVENTION

Figure 3A:
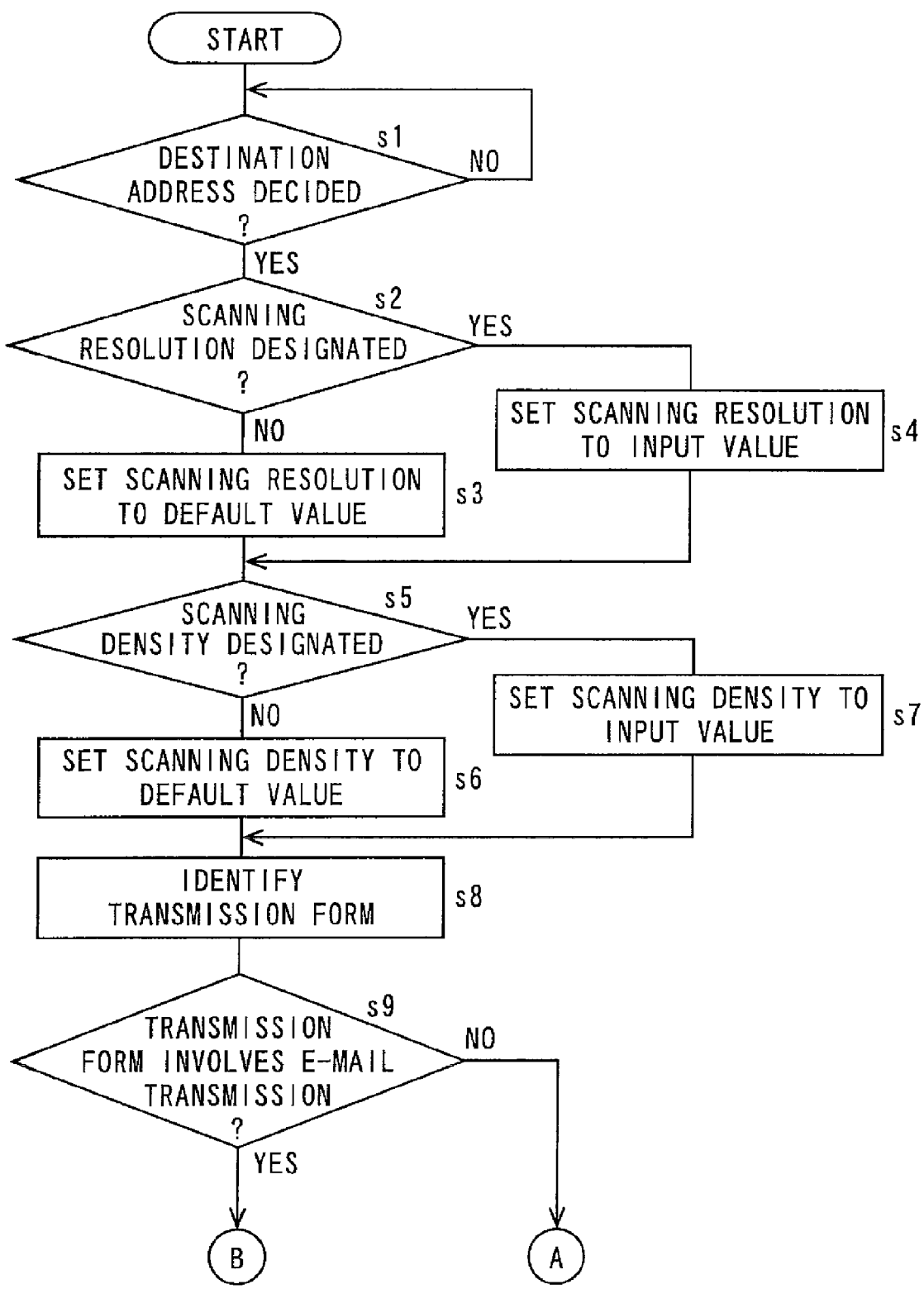
FIG. 3A is a flow chart showing an operational procedure of the control section.

Now referring to the drawings, preferred embodiments of the invention will be described in detail.

FIG. 1 is a block diagram showing the electrical configuration of a facsimile e-mail transmission apparatus 1 in accordance with one embodiment of the invention. The facsimile e-mail transmission apparatus (hereafter also referred to as "facsimile apparatus") 1 serving as an image communication apparatus includes a control section 2 for controlling the working of the apparatus as a whole; a document detecting section 3; a reading section 4; an image processing section 5; a facsimile transmitting section (hereafter referred to as "FAX transmitting section") 6; an e-mail transmitting section 7; a transmission form identifying section 8; a memory 9 serving as a storage section; a display section 10; and an input section 11.

The control section 2 includes, for example, a Central Processing Unit (CPU for short), a ROM (Read Only Memory), a RAM (Random Access Memory), a bus, an input/output interface (expressed as "I/O" in FIG. 1), and a driving circuit (not shown in the figures). In the control section 2, the CPU executes a program stored in the ROM thereby to perform operations as shown in flow charts which will be described later. In this way, the working of the apparatus as a whole is controlled by the control section 2. The document detecting section 3 is a document detecting sensor for detecting the presence or absence of a document. The document detecting section 3 detects whether or not a document is set in place in a reading device having a document tray. When a document is placed on the document tray, the document detecting section 3 produces an output of the document placement to the control section 2.

The input section 11, which is constructed for example of an operation key, has a key-input function to perform address input, message input, and apparatus operation. Inputted information is sent from the input section 11 to the control section 2. The display section 10 is constructed for example of a liquid crystal display. This display section 10 indicates at least one of information based on the details inputted through the input section 11 and default-specified information stored for example in the memory 9.

The reading section 4 reads the document placed on the document tray by means of an optical sensor. The read image information (hereafter also referred to as "image data") is sent from the reading section 4 to the control section 2. The image processing section 5 receives the image data read by the reading section 4 from the control section 2, and then subjects the received image data to conversion process so as to obtain transmission form-adapted image data. For example, the image processing section 5 performs conversion process such as resolution conversion or binarization. The image data having undergone the conversion process is sent to the control section 2.

The memory 9, which is constructed for example of a storage device such as a semiconductor memory, stores therein target data to be transmitted by means of facsimile transmission (hereafter referred to as "FAX transmission") or e-mail transmission (hereafter referred to as "transmission target data"), a destination address list, and so forth.

The FAX transmitting section 6 effects FAX transmission of the transmission target data. The FAX transmitting section 6 is connected to a public line so as to control FAX communication between the facsimile apparatus and another image communication apparatus connected to a communication network via the public line. The transmission target data that is transmitted by the FAX transmitting section 6 is, for example, the image data read by the reading section 4 or the image data stored in the memory 9.

The e-mail transmitting section 7 effects e-mail transmission of the transmission target data. The e-mail transmitting section 7 is connected to a network such as LAN (Local Area Network) so as to establish communication with an e-mail server thereby to transmit e-mails.

The transmission form identifying section 8 effects transmission form identification to transmit the transmission target data in at least one of FAX transmission form and e-mail transmission form. The transmission form identifying section 8 identifies a transmission form by, for example, receiving the information inputted through the input section 11 from the control section 2. For example, when the destination address inputted through the input section 11 includes an e-mail address, the transmission form identifying section 8 determines that the transmission form involves e-mail transmission. On the other hand, when the destination address inputted through the input section 11 includes a telephone number, the transmission form identifying section 8 determines that the transmission form involves FAX transmission. Moreover, when a plurality of destination addresses are inputted through the input section 11 and these destination addresses include both an e-mail address and a telephone number, then the transmission form identifying section 8 determines that the transmission form involves both e-mail transmission and FAX transmission.

FIG. 2 is a perspective view of the facsimile apparatus 1 related to this embodiment. In the facsimile apparatus 1, on the front face of a facsimile apparatus main body 1A is disposed an operation key 12 that corresponds to the input section 11, for carrying out input operation. Moreover, the facsimile apparatus main body 1A has a display device 13 which corresponds to the display section 10 and is constructed for example of a liquid crystal display. With the provision of the display device 13, it is possible to check the information inputted through the operation key 12 and so forth. A reading device 14, which corresponds to the reading section 4, is a device for reading a document in an optical manner. A telephone-line modular jack 15, which is a modular jack for FAX transmission, is electrically connected to a public line. A LAN modular jack 16, which is a modular jack for e-mail transmission, is electrically connected to a LAN.

FIG. 3A is a flow chart showing an operational procedure of the control section 2. Unless otherwise stated, the flows of operation are controlled predominantly by the CPU. The flow chart of FIG. 3A shows the first half of the operational procedure of the control section 2. Upon start-up of the operation under a condition of switching the power source of the facsimile apparatus 1 from OFF to ON, the procedure proceeds to Step s1.

In Step s1, it is determined whether a destination address to which the transmission target data is to be transmitted has been decided or not. The destination address is inputted by the user's operation of the operation key 12 corresponding to the input section 11. Address input by the user may be carried out by directly entering characters or numerals, or by selecting, after bringing the display device 13 into action to display a registration list, a target destination address from the displayed destination addresses registered in the list. In addition, a plurality of destination addresses may be inputted as the destination address. When it is determined in Step s1 that a destination address has not been decided yet, the procedure returns to Step s1. When it is determined in Step s1 that a destination address has been decided, the procedure proceeds to Step s2.

In Step s2, it is determined whether or not there is designation of a scanning resolution. Scanning resolution designation is made by the user's operation of the operation key 12 corresponding to the input section 11 in a manner to input a scanning resolution. When the input of a scanning resolution is made, the control section 2 determines that there is designation of a scanning resolution. When the input of a scanning resolution is not made, the control section 2 determines that there is no designation of a scanning resolution. When it is determined in Step s2 that there is no designation of a scanning resolution, the procedure proceeds to Step s3. When it is determined in Step s2 that there is designation of a scanning resolution, the procedure proceeds to Step s4.

In Step s3, the scanning resolution is set to a default value. The default value of the scanning resolution is stored in the memory 9. Following the setting of the scanning resolution to the default value in Step s3, the procedure proceeds to Step s5. Moreover, in Step s4, the scanning resolution is set to an input value inputted through the operation key 12. Following the setting of the scanning resolution to the input value in Step s4, the procedure proceeds to Step s5.

In Step s5, it is determined whether or not there is designation of a scanning density. Scanning density designation is made by the user's operation of the operation key 12 corresponding to the input section 11 in a manner to input a scanning density. When the input of a scanning density is made, the control section 2 determines that there is designation of a scanning density. When the input of a scanning density is not made, the control section 2 determines that there is no designation of a scanning density. When it is determined in Step s5 that there is no designation of a scanning density, the procedure proceeds to Step s6. When it is determined in Step s5 that there is designation of a scanning density, the procedure proceeds to Step s7.

In Step s6, the scanning density is set to a default value. The default value of the scanning density is stored in the memory 9. Following the setting of the scanning density to the default value in Step s6, the procedure proceeds to Step s8. Moreover, in Step s7, the scanning density is set to an input value inputted through the operation key 12. Following the setting of the scanning density to the input value in Step s7, the procedure proceeds to Step s8.

In Step s8, the transmission form for transmitting the transmission target data is identified by the transmission form identifying section 8. As described previously, for example, when the inputted destination address includes an e-mail address, the transmission form identifying section 8 determines that the transmission form involves e-mail transmission. On the other hand, when the inputted destination address includes a telephone number, the transmission form identifying section 8 determines that the transmission form involves FAX transmission. Moreover, when the inputted destination address includes both an e-mail address and a telephone number, the transmission form identifying section 8 determines that the transmission form involves both FAX transmission and e-mail transmission. Upon the transmission form for transmitting the transmission target data being identified by the transmission form identifying section 8 in Step s8, the procedure proceeds to Step s9.

In Step s9, it is determined whether the transmission form identified in Step s8 involves e-mail transmission or not. When the transmission form is determined to involve e-mail transmission, the procedure proceeds to Step s21 shown in FIG. 3C. When the transmission form is determined not to involve e-mail transmission, the procedure proceeds to Step s11 shown in FIG. 3B.

Figure 3B:
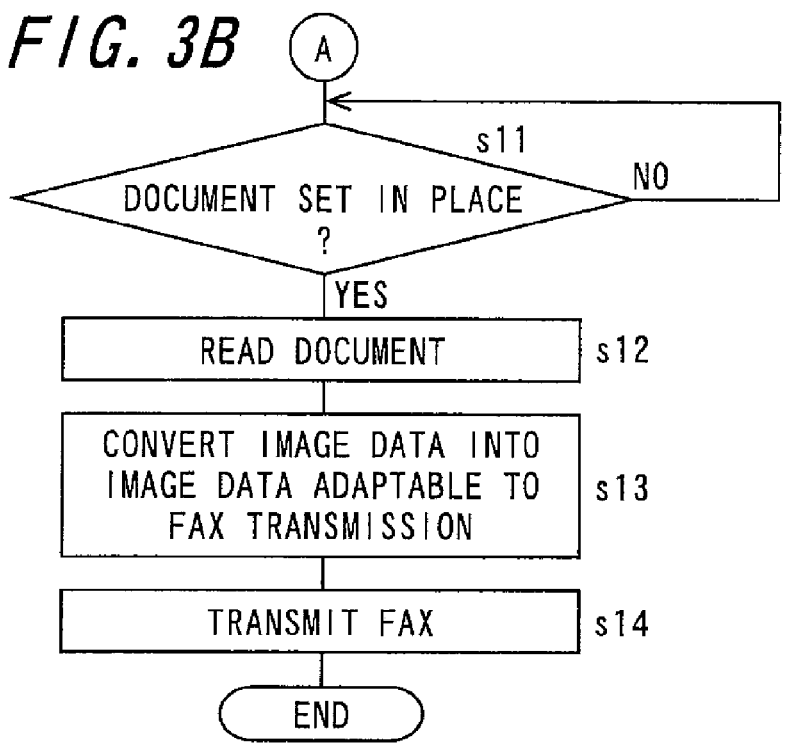
FIGS. 3B and 3C are flow charts showing procedural steps following the operational procedure of the control section illustrated in FIG. 3A.
Figure 3C:
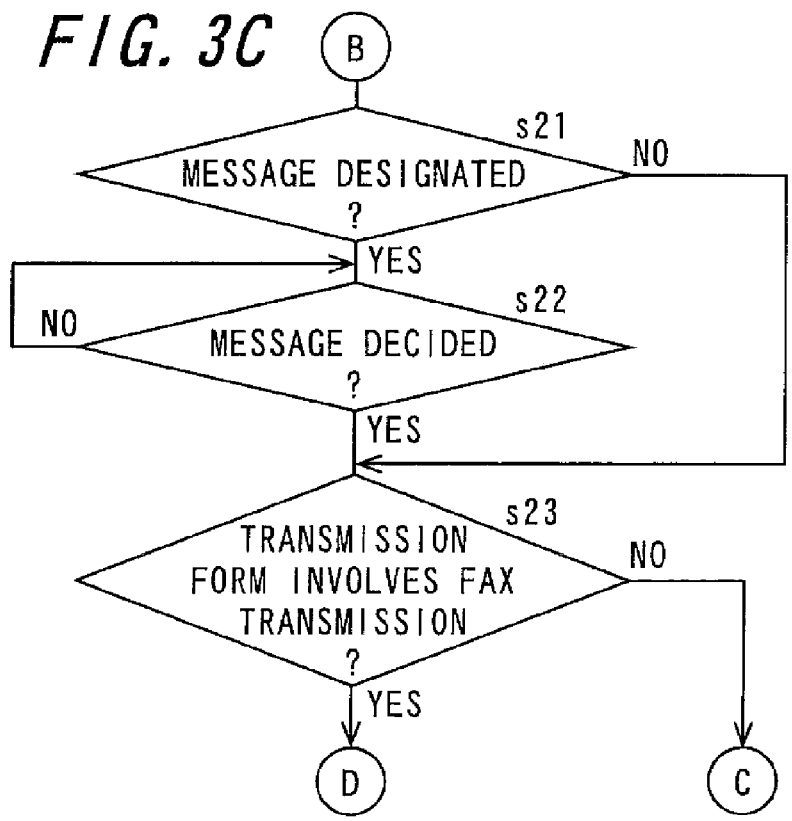
Figure 3E:
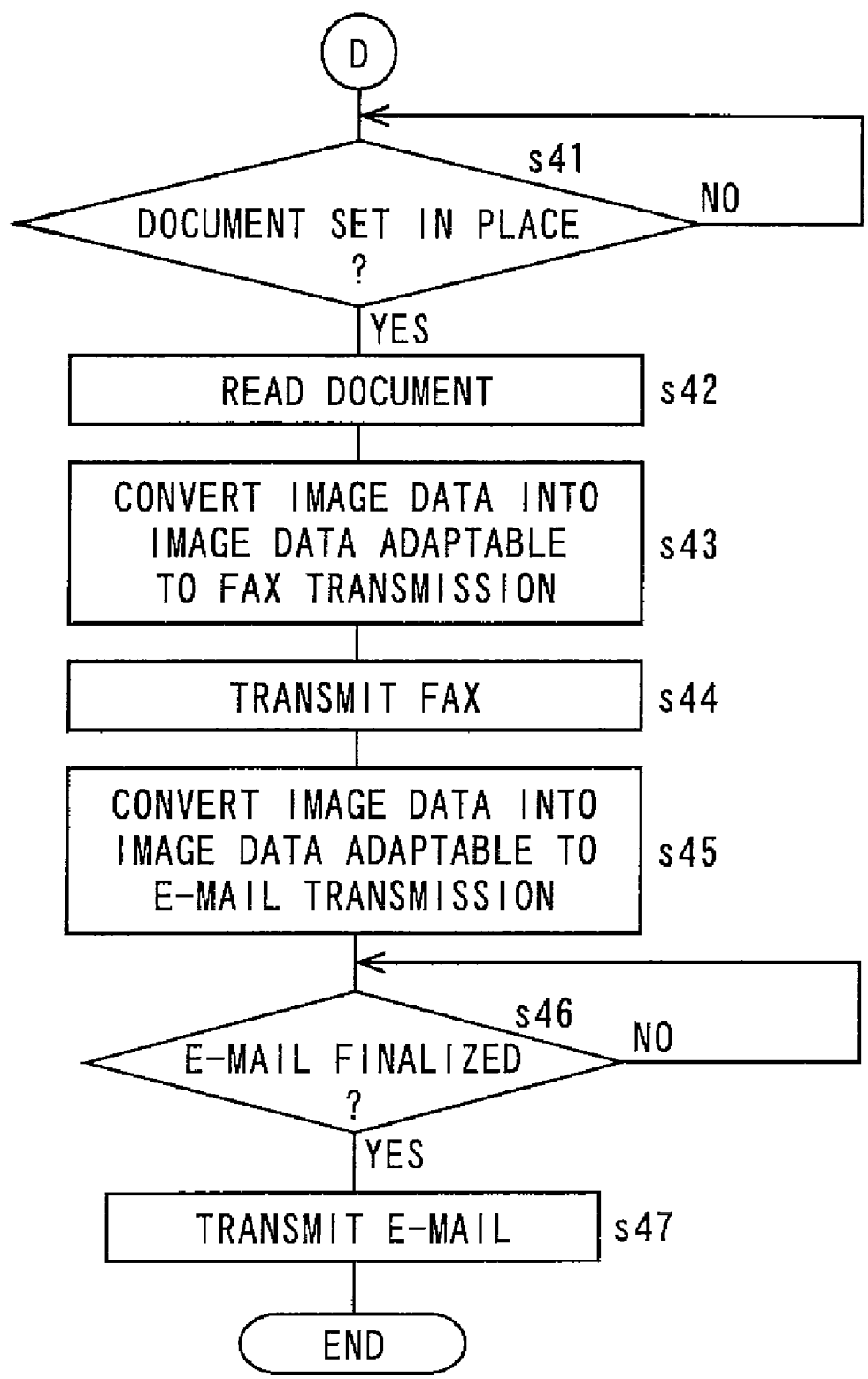

FIGS. 5B and 3C, as well as FIGS. 3D and 3E, are flow charts showing procedural steps following the operational procedure of the control section 2 illustrated in FIG. 3A. FIG. 3B is a flow chart showing procedural steps following the operational procedure illustrated in FIG. 3A in a case where the transmission form does not involve e-mail transmission. FIG. 3C is a flow chart showing procedural steps following the operational procedure illustrated in FIG. 3A in a case where the transmission form involves e-mail transmission. Moreover, FIG. 3D is a flow chart showing procedural steps following the operational procedure illustrated in FIG. 3C in a case where the transmission form involves e-mail transmission but does not involve FAX transmission. Further, FIG. 3E is a flow chart showing procedural steps following the operational procedure illustrated in FIG. 3C in a case where the transmission form involves both e-mail transmission and FAX transmission.

When it is determined in Step s9 shown in FIG. 3A that the transmission form does not involve e-mail transmission, the procedure proceeds to Step s11 shown in FIG. 3B.

In Step s1, it is determined whether placement of a document has been detected or not. That is, it is determined whether or not the document detecting section 3 has detected the placement of a document on the document tray of the reading device 14. When the document placement is detected, the procedure proceeds to Step s12. When the document placement is not detected, the procedure returns to Step s11.

In Step s12, the document placed on the document tray of the reading device 14 is read by the reading section 4. In a case where a plurality of documents are set in place, the reading section 4 may be allowed to read all of these documents. Following the reading of the document(s) in Step s12, the procedure proceeds to Step s13.

In Step s13, the image data is converted into image data adaptable to FAX transmission. Specifically, by the image processing section 5, the resolution and image size of the image data read by the reading section 4 in Step s12 are so converted as to be adapted for FAX transmission. Following the conversion of the image data into FAX transmission-adapted image data in Step s13, the procedure proceeds to Step s14.

In Step s14, the FAX transmitting section 6 acts to originate a call through to the telephone number of the inputted destination address thereby to effect FAX transmission of the image data converted in Step s13. Then, the procedure comes to an end.

When it is determined in Step s9 shown in FIG. 3A that the transmission form involves e-mail transmission, the procedure proceeds to Step s21 shown in FIG. 3C.

In Step s21, it is determined whether a message is inputted or not as the transmission target data that is transmitted by means of e-mail transmission. The control section 2 effects control of the display device 13 in a manner so as to display a notice about designation of message input to urge the user to determine whether to input a message. "Message" refers to text data to be inputted as a title, the main body of a document, etc. of an e-mail, such as a character, a numeral, and a symbol. When the designation indicating that a message is to be inputted is made by the user, by operating the operation key 12 corresponding to the input section 11, the procedure proceeds to Step s22. When the designation indicating that no message is to be inputted is made by the user, the procedure proceeds to Step s23.

In Step s22, it is determined whether a message to be transmitted as the transmission target data has been decided or not. The message is decided by directly entering characters, numerals, or the like with the operation key 12 corresponding to the input section 11. Alternatively, the message may be decided by selecting, after bringing the display device 13 into action to display fixed phrases stored in the memory, a target fixed phrase from the displayed fixed phrases. The control section 2 determines whether the message has been decided or not. When it is determined in Step s22 that the message has not been decided yet, the procedure returns to Step s22. When it is determined in Step s22 that the message has been decided, the procedure proceeds to Step s23.

In Step s23, it is determined whether the transmission form identified in Step s8 shown in FIG. 3A involves FAX transmission or not. When it is determined that the transmission form involves FAX transmission, the procedure proceeds to Step s41 shown in FIG. 3E. When it is determined that the transmission form does not involve FAX transmission, the procedure proceeds to Step s31 shown in FIG. 3D.

In Step s31, it is determined whether placement of a document has been detected or not. That is, it is determined whether or not the document detecting section 3 has detected the placement of a document on the document tray of the reading device 14. When the document placement is detected, the procedure proceeds to Step s34. When the document placement is not detected, the procedure proceeds to Step s32.

In Step s32, an output indicative of whether or not e-mail transmission can be effected without attachment of image data, is produced. This output is issued by bringing the display device 13 into action to display a notice about whether or not e-mail transmission is permitted without attachment of image data file. Following the production of the output indicative of whether to permit e-mail transmission in Step s32, the procedure proceeds to Step s33.

In Step s33, it is determined whether or not e-mail transmission is to be effected without attachment of image data. In Step s32, an indication is outputted by the display device 13 to urge the user to make designation as to whether to effect e-mail transmission and thereafter, in Step s33, when designation of execution of e-mail transmission without attachment of document image data is issued by the user's operation of the operation key 12, then the procedure proceeds to Step s36. On the other hand, when designation of execution of e-mail transmission along with attachment of document image data is made by the user, as well as when designation of execution of e-mail transmission without attachment of document image data is not made by the user, then the procedure returns to Step s31 and it is determined once again whether placement of a document has been detected or not.

Upon the detection of document placement in Step s31, the procedure proceeds to Step s34. In Step s34, the document placed on the document tray of the reading device 14 is read by the reading section 4. In a case where a plurality of documents are set in place, the reading section 4 may be allowed to read all of these documents. Following the reading of the document(s) in Step s34, the procedure proceeds to Step s35.

In Step s35, the image data is converted into image data adaptable to e-mail transmission. Specifically, by the image processing section 5, the image data read by the reading section 4 in Step s34 is converted into a file format suitable for e-mail transmission. As the file format suitable for e-mail transmission, for example, a computer-readable file format can be adopted, such as TIFF (Tagged Image File Format) and PDF (Portable Document Format). Following the conversion of the image data into e-mail transmission-adapted image data in Step s35, the procedure proceeds to Step s36.

In Step s36, it is determined whether the created e-mail has been finalized or not. The user confirms that the created e-mail can be transmitted, and operates the operation key 12 corresponding to the input section 11. A judgment as to finalization of the created e-mail is made by checking whether or not the control section 2 received an input indicating that the e-mail can be transmitted.

The "created e-mail" is, specifically, an e-mail bearing the message inputted through the input section 11 and decided in Step s22, with the image data converted into the e-mail transmission-adapted file format in Step s35 attached thereto as an attachment file. The created e-mail is stored in the memory 9 in each of the procedural steps thus far described.

However, when the designation indicating that no message is inputted is made in Step s21, the created e-mail bears no message. Moreover, when the procedure proceeds from Step s33 directly to Step s36 with Step s34 and Step s35 skipped, then image data to be attached in attachment-file form does not exist. Accordingly, the created e-mail contains no attachment file of image data. Further, when the designation indicating that no message is inputted is made in Step s21 and no image data is attached to the e-mail, then the created e-mail contains neither message nor attachment file of image data.

When it is determined in Step s36 that the created e-mail has not been finalized, the procedure returns to Step s36. When it is determined in Step s36 that the created e-mail has been finalized, the procedure proceeds to Step s37.

In Step s37, by the e-mail transmitting section 7, the e-mail is transmitted to the e-mail address of the inputted destination address. Then, the procedure comes to an end.

When it is determined in Step s23 shown in FIG. 3C that the transmission form involves FAX transmission, the procedure proceeds to Step s41 shown in FIG. 3E.

The operations corresponding to Steps s41 to s44 are the same as those corresponding to Steps s11 to s14, respectively, shown in FIG. 3B. Moreover, the operations corresponding to Steps s45 to s47 are the same as those corresponding to Steps s35 to s37, respectively, shown in FIG. 3D. Therefore, the descriptions of Steps s41 to s47 will be omitted; nevertheless, in Step s44, out of the inputted destination addresses, only a telephone number is extracted and FAX transmission is effected to the extracted telephone number. Moreover, in Step s47, out of the inputted destination addresses, only an e-mail address is extracted and e-mail transmission is effected to the extracted e-mail address.

As described heretofore, according to the facsimile apparatus 1 of this embodiment, on the basis of the result of detection provided by the document detecting section 3 in Step s31, the control section 2 determines, in Step s33, whether or not the e-mail is transmitted with use of an attachment file by the e-mail transmitting section 7.

Specifically, when it is determined in Step s9 that the transmission form involves e-mail transmission and, and when the presence of a document is detected in Step s31 or Step s41, the control section 2 effects transmission of the e-mail containing the attachment file of the document data read by the reading section 4 in Step s37 or Step s47. Moreover, when it is determined in Step s9 that the transmission form involves e-mail transmission, when it is determined in Step s23 that the transmission form does not involve FAX transmission, and when the absence of a document is detected in Step s31, then the e-mail can be transmitted without attachment of image data in attachment-file form in Step s37.

In this way, when the transmission form involves only e-mail transmission and no document is set in place, then the facsimile apparatus 1 can effect e-mail transmission without attachment of document image data to an e-mail. This makes it possible to transmit an e-mail containing no attachment file, for example, an e-mail bearing only a message. Accordingly, the facsimile apparatus 1 succeeds in achieving e-mail transmission with excellent versatility and excellent convenience.

Moreover, in the facsimile apparatus 1 of this embodiment, the data read by the reading section 4 can be FAX-transmitted by the FAX transmitting section 6. Further, by the transmission form identifying section 8, the transmission form for transmitting the transmission target data is identified; that is, it is determined whether the transmission form involves, out of FAX transmission and e-mail transmission, e-mail transmission or not. In the facsimile apparatus 1, on the basis of the transmission form identified by the transmission form identifying section 8, whether document placement is necessary or not can be determined.

In this embodiment, when it is determined in Step s9 that the transmission form does not involve e-mail transmission, then the control section 2 determines that the transmission form is FAX transmission. In this case, if no document is set in place, the user will be urged to set a document in place. As a result, the image data read by the reading section 4 can be subjected to FAX transmission.

Moreover, when it is determined in Step s9 that the transmission form involves e-mail transmission, and when it is determined in Step s23 that the transmission form involves FAX transmission, then, if no document is set in place, the user will be urged to set a document in place, and the image data read by the reading section 4 can be subjected to both FAX transmission and e-mail transmission.

Further, when it is determined in Step s9 that the transmission form involves e-mail transmission, and when it is determined in Step s23 that the transmission form does not involve FAX transmission, then, even if no document is set in place, it is possible to transmit an e-mail containing no image data without using an attachment file.

In this way, when the transmission form involves FAX transmission, regardless of whether the transmission form further involves e-mail transmission or not, it is possible to urge the user to set in place a document having image data that is necessary as the transmission target data subjected to FAX transmission. This enables FAX transmission of the image data without fail. On the other hand, when the transmission form does not involve FAX transmission, there may be a case where no image data is needed as the transmission target data. In this case, an e-mail containing no attachment file, for example, an e-mail bearing only a message, can be transmitted.

Moreover, in this embodiment, on the basis of the result of detection provided by the document detecting section 3 in Step s31, the control section 2 produces, in Step s32, an output indicative of whether the e-mail can be transmitted by the e-mail transmitting section 7 or not.

Specifically, when it is determined in Step s9 that the transmission form involves e-mail transmission, when it is determined in Step s23 that the transmission form does not involve FAX transmission, and when document placement has not been detected in Step s31, then, in Step s32, the display section 10 is so controlled as to output an indication as to whether to permit e-mail transmission without an attachment file, and, in Step s33, the user is urged to determine whether to effect e-mail transmission without an attachment file. In this way, it is possible for the user to recognize the absence of an attachment file of image data in advance of e-mail transmission. Therefore, even if the user forgets to set a document in place, an e-mail containing no attachment of document image data can be prevented from being transmitted without fail.

Moreover, in this embodiment, it is determined in Step s36 whether the created e-mail has been finalized or not. With the provision of such a step, it is possible to prevent erroneous e-mail transmission without fail.

For example, when it is determined in Step s9 that the transmission form involves e-mail transmission, when it is determined in Step s21 that no message is inputted, when document placement has not been detected in Step s31, and when it is determined in Step s33 that e-mail transmission is effected without attachment of document image data, then, if a step as described just above of confirming permission to effect e-mail transmission is omitted, a blank mail will be transmitted to the destination address, because neither message nor attachment file is included in the e-mail as the transmission target data. A "blank mail" refers to a mail in which no message is inputted either in a title bar and in the main body of a document, and no attachment file is contained. In this regard, by carrying out the above-described step, it is possible for the user to confirm the details of the created e-mail. Therefore, when, for example, the user forgot to input messages, it is possible to prevent a blank mail from being transmitted to the destination address. Meanwhile, when permission to transmit an e-mail containing neither message nor image data is confirmed in the above-described step, it is possible to transmit a blank mail to the destination address.

The facsimile apparatus 1 thus far described is not limited to the above-described structure and may be subjected to various changes and modifications.

Although the above description deals with, as one embodiment of the image communication apparatus of the invention, the facsimile e-mail transmission apparatus 1 having the FAX transmitting section 6 and the e-mail transmitting section 7, the image communication apparatus of the invention is not limited thereto. For example, the image communication apparatus may be built as a multi-functional peripheral having no FAX transmitting section. In a case where the image communication apparatus has no FAX transmitting section, there is no need to dispose a transmission form identifying section.

Note also that the flow charts associated with the operations conducted by the control section 2 are not limited to those as suggested hereinabove, and therefore various changes and modifications are possible.

For example, it is possible to make changes to the chronological order of the judgment as to destination address confirmation in Step s1, the setting of scanning resolution in Step s2 and Step s3 or Step s4, and the setting of scanning density in Step s5 and Step s6 or Step s7; that is, destination-address judgment, scanning-resolution setting, and scanning-density setting can be arranged in the place of one another in the flow chart. It is also possible to make changes to the chronological order of the FAX transmission step including Step s43 and Step s44 and the e-mail transmission step including Step s45, Step s46, and Step s47; that is the FAX transmission step and the e-mail transmission step can be arranged in the place of each other in the flow chart.

The invention may be embodied in other various forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. An image communication apparatus comprising:
   a document detecting section for detecting the presence or absence of a document;
   a reading section for reading a document;
   an e-mail transmitting section for effecting e-mail transmission of target data to be transmitted, said target data including text data of an e-mail message; and
   a control section for determining that controls the e-mail transmitting section, based on a result of detection provided by the document detecting section, whether or not an e mail is transmitted with use of an attachment file by the e mail transmitting section,
   such that in response to a detection result indicating the presence of a document, the e-mail transmitting section transmits image data obtained by reading the document as an attachment file with the e-mail message, and
   such that in response to a detection result indicating the absence of a document, the control section causes a notice to be displayed to a user of the image communication apparatus, the notice requesting user input indicating whether or not e-mail transmission is permitted without an attachment file; and
   in response to a user input indicating that e-mail transmission is permitted without an attachment file, the e-mail transmitting section transmits the target data as an e-mail message without an attachment file.

2. The image communication apparatus of claim 1, further comprising:
   a facsimile transmitting section for effecting facsimile transmission of data read by the reading section; and
   a transmission form identifying section for identifying a transmission form to transmit target data to be transmitted in at least one of facsimile transmission form and e-mail transmission form.

3. The image communication apparatus of claim 1,
   wherein, based on a result of detection provided by the document detecting section, the control section exercises control in such a manner as to produce an output indicative of whether e-mail transmission can be effected by the e-mail transmitting section or not.

4. The image communication apparatus of claim 2,
   wherein, based on a result of detection provided by the document detecting section, the control section exercises control in such a manner as to produce an output indicative of whether e-mail transmission can be effected by the e-mail transmitting section or not.

5. An image communication method, the method comprising:
   detecting the presence or absence of a document;
   computationally reading the detected document in response to a detection result indicating the presence of a document, said computationally reading including creating image data of the detected document;
   transmitting, in the form of e-mail, target data to be transmitted, said target data including text data of an e-mail message; and
   controlling, with a control section, said transmitting based on the detection result of said detecting step,
   such that in response to a detection result indicating the presence of a document,
      requesting user input indicating whether or not e-mail transmission is permitted without an attachment file; and
      in response to receiving user input indicating that e-mail transmission is permitted without an attachment file, said transmitting includes transmitting said image data as an attachment file with the e-mail message, and
   such that in response to a detection result indicating the absence of a document, said transmitting includes transmitting the target data as an e-mail message without an attachment file.

6. The image communication method of claim 5, said controlling further comprising identifying a transmission form to transmit said target data in at least one of: the form of a facsimile and the form of an e-mail; and
   said transmitting further comprising transmitting said image data in the form of a facsimile in response to an identified transmission form that includes the form of a facsimile.

7. The image communication method of claim 5, said controlling further comprising determining whether said transmitting will result in successful transmission of target data; and
   the method further comprising producing an output indicative of said determining outcome.

8. The image communication method of claim 6, said identifying further comprising:
   determining whether said transmitting will result in successful transmission of target data; and
   producing, with said control section, an output indicative of said determining outcome; and
   where said transmitting includes transmitting in the identified transmission form based on said produced output.

* * * * *